United States Patent
Seine et al.

(10) Patent No.: US 10,432,575 B2
(45) Date of Patent: Oct. 1, 2019

(54) CONFIGURING A PROTOCOL ADDRESS OF A NETWORK DEVICE USING AN ADDRESS RESOLUTION PROTOCOL REQUEST

(71) Applicant: Verizon Deutschland GmbH, Arlington, VA (US)

(72) Inventors: Martin Seine, Haltern am See (DE); Andreas Trilling, Dortmund (DE)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 281 days.

(21) Appl. No.: 14/976,413

(22) Filed: Dec. 21, 2015

(65) Prior Publication Data

US 2017/0180305 A1 Jun. 22, 2017

(51) Int. Cl.
*G06F 15/173* (2006.01)
*H04L 29/12* (2006.01)

(52) U.S. Cl.
CPC ........ *H04L 61/103* (2013.01); *H04L 61/2023* (2013.01); *H04L 61/6022* (2013.01); *H04L 61/2015* (2013.01)

(58) Field of Classification Search
CPC .......................... H04L 29/12018; H04L 69/16
See application file for complete search history.

(56) References Cited

U.S. PATENT DOCUMENTS

| | | | |
|---|---|---|---|
| 6,961,336 B2* | 11/2005 | Coggeshall | H04L 29/12018 370/218 |
| 6,965,929 B2* | 11/2005 | Kumar | H04L 29/12254 709/220 |
| 7,548,523 B2* | 6/2009 | Babbar | |
| 7,596,693 B1* | 9/2009 | Caves | H04L 29/12028 713/161 |
| 7,724,679 B2* | 5/2010 | Shimada | H04L 29/1232 370/252 |
| 7,904,534 B2* | 3/2011 | Lobbert | H04L 29/12018 709/220 |
| 8,904,041 B1* | 12/2014 | Poutievski | H04L 61/103 709/245 |
| 2004/0153575 A1* | 8/2004 | Coggeshall | H04L 29/12018 709/245 |
| 2005/0251552 A1* | 11/2005 | Champel | H04L 29/1232 709/204 |
| 2009/0006635 A1* | 1/2009 | Siegmund | H04L 29/12028 709/228 |
| 2010/0154049 A1* | 6/2010 | Yoshimi | H04L 63/02 726/13 |

(Continued)

OTHER PUBLICATIONS

Wikipedia, "Address Resolution Protocol," https://en.wikipedia.org/wiki/Address_Resolution_Protocol, Nov. 9, 2015, 7 pages.

(Continued)

*Primary Examiner* — Umar Cheema
*Assistant Examiner* — Tesfu N Mekonen (57) ABSTRACT

A device may monitor a network port for an address resolution protocol (ARP) request from a sender device. The device may detect the ARP request based on monitoring the network port for the ARP request. The device may identify a target protocol address included in the ARP request. The device may configure a protocol address of the device using the target protocol address.

20 Claims, 5 Drawing Sheets

(56) References Cited

U.S. PATENT DOCUMENTS

2010/0332212 A1* 12/2010 Finkelman ............ G06F 1/3203
703/23
2014/0022936 A1* 1/2014 Robitaille ........... H04L 61/2007
370/254

OTHER PUBLICATIONS

Plummer, "RFC 826: an Ethernet Address Resolution Protocol or Converting Network Protocol Addresses," https://tools.ietf.org/html/rfc826, Nov. 1982, 14 pages.

* cited by examiner

CONFIGURING A PROTOCOL ADDRESS OF A NETWORK DEVICE USING AN ADDRESS RESOLUTION PROTOCOL REQUEST

BACKGROUND

A network device may connect to a network port serving as a communication endpoint for a network. The network device may be associated with a protocol address. For example, the protocol address may include an internet protocol (IP) address, where a numerical label is associated with each network device that uses an internet protocol for communication. In some cases, a server of a network (e.g., a network protocol server, etc.) may automatically assign the protocol address to the network device.

DETAILED DESCRIPTION OF PREFERRED EMBODIMENTS

The following detailed description of example implementations refers to the accompanying drawings. The same reference numbers in different drawings may identify the same or similar elements.

An auto-configuration device may refer to a device that can be configured by using a network to connect to a server and downloading configuration information to configure the auto-configuration device. The auto-configuration device may connect to the network via a network port (e.g., an Ethernet port, etc.), and may obtain a protocol address (e.g., an IP address, etc.) for the auto-configuration device prior to establishing a connection with the network and performing the auto-configuration. For example, the auto-configuration device may obtain the protocol address using a request-response protocol, such as a dynamic host configuration protocol (DHCP), a bootstrap protocol (BOOTP), a technical report 069 protocol (TR-069), or the like.

In some cases, the auto-configuration device may be unable to obtain the protocol address from a network protocol server because the network protocol server is not configured to provide the protocol address using one of the used request-response protocols of the auto-configuration device. This may reduce compatibility between the auto-configuration device and the network, which may interfere with the intended operation of the auto-configuration device or prevent the auto-configuration device from connecting to the network. Furthermore, the auto-configuration device may require pre-configuration or preparation (e.g., manual configuration, etc.) to enable configuration of the protocol address of the auto-configuration device via the protocol that the network protocol server uses (e.g., DHCP, BOOTP, TR-069, etc.). In some cases, the pre-configuration or preparation may be resource intensive, costly, and/or time consuming.

Implementations described herein enable the auto-configuration device to flexibly configure the protocol address of the auto-configuration device by using information associated with an address resolution protocol (ARP) request sent by one or more ARP sender devices. This may enable the auto-configuration device to obtain a protocol address independently of the network protocol server. In this way, the auto-configuration device may have increased compatibility with the network, and may conserve computing resources that would otherwise be used to pre-configure the auto-configuration device.

Figure 1A:
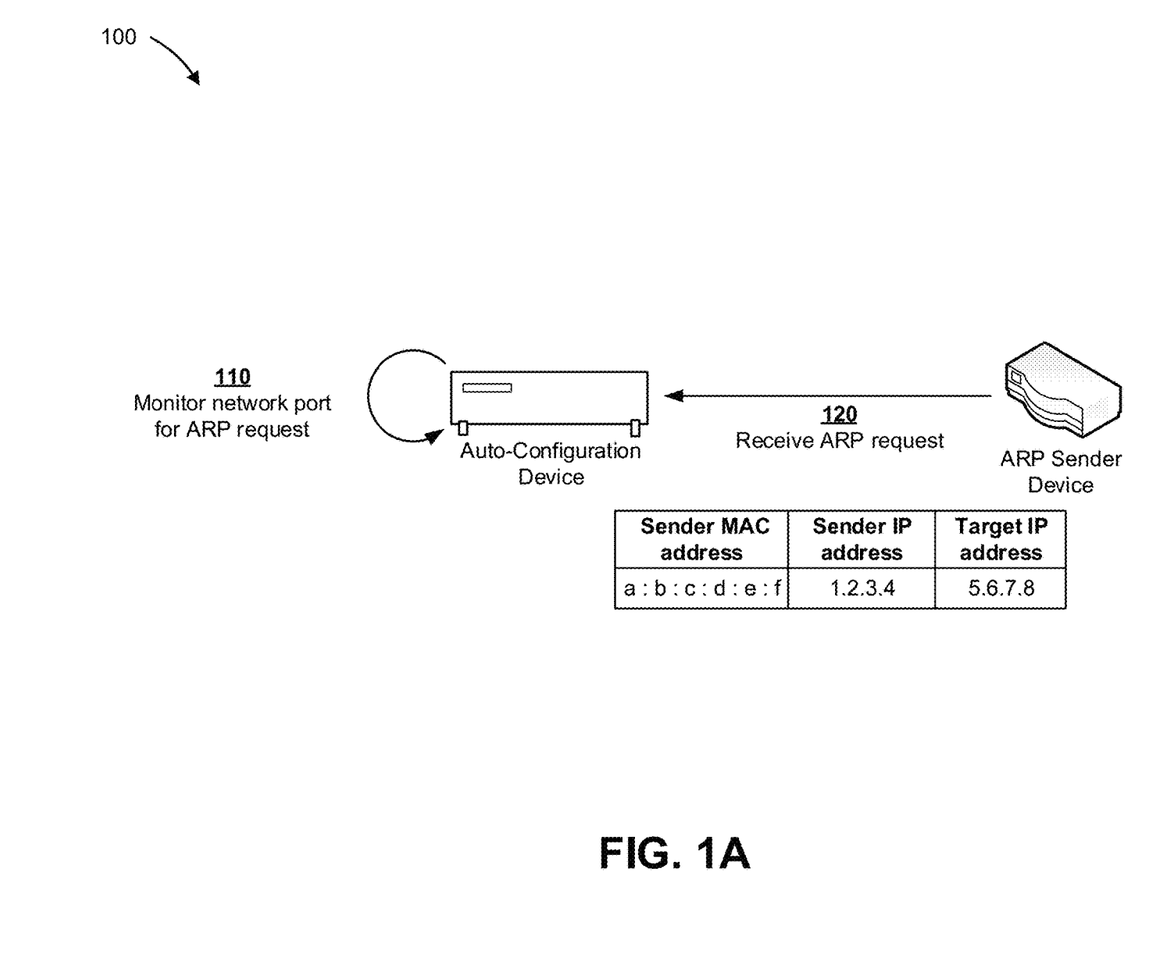
FIGS. 1A and 1B are diagrams of an overview of an example implementation described herein.
Figure 1B:
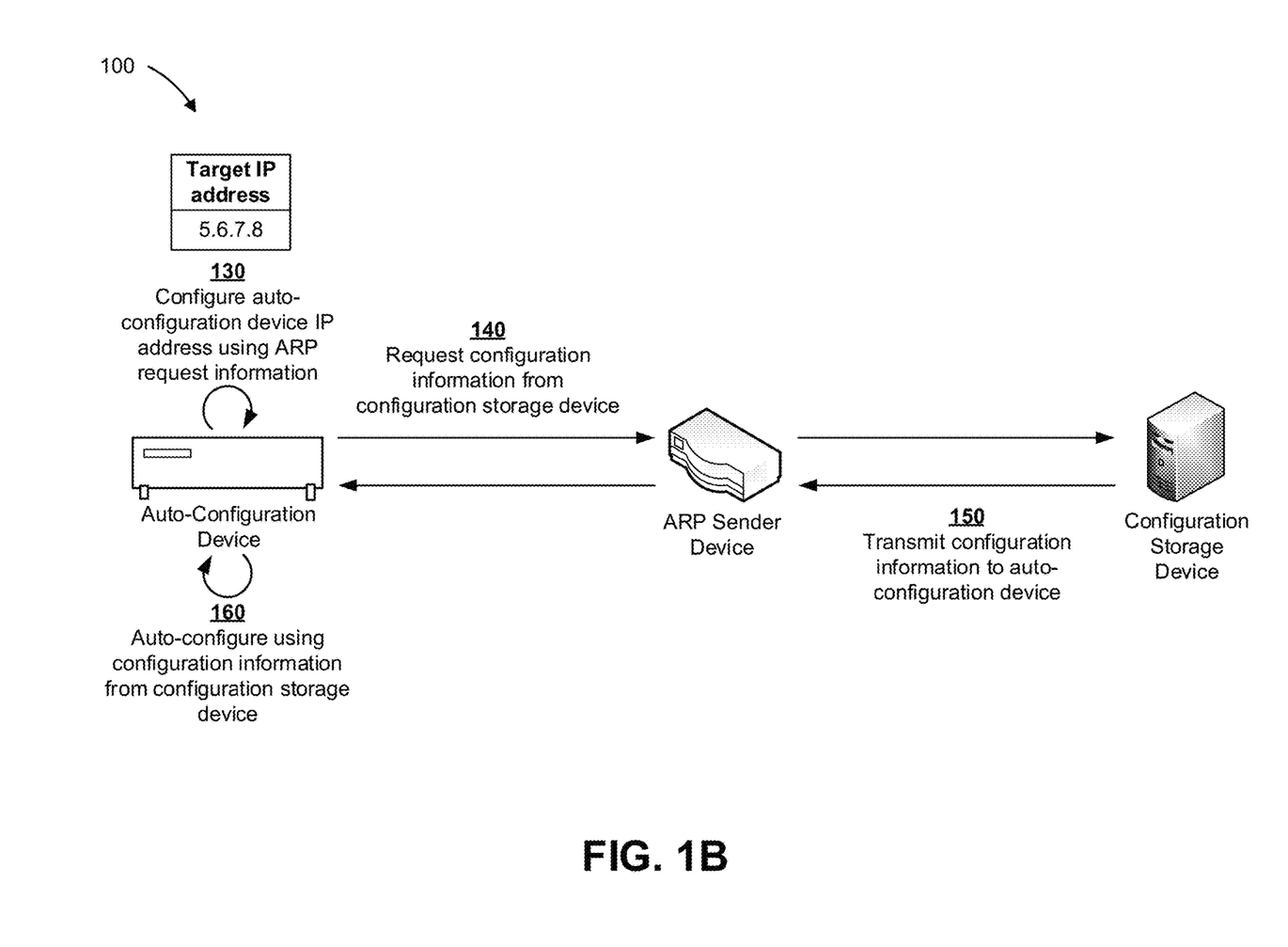

FIGS. 1A and 1B are diagrams of an overview of an example implementation 100 described herein. As shown in FIG. 1A, and by reference number 110, an auto-configuration device, such as a set-top box, a router, a machine-to-machine device, a cloud-controlled device, a modem, a gateway, or the like, may monitor a network port (e.g., an Ethernet port) for an ARP request. ARP, or address resolution protocol, may refer to a telecommunication protocol used for mapping a network address (e.g., an internet protocol (IP) address, etc.) to a physical address (e.g., a hardware address, such as a media access control (MAC) address, etc.).

As shown by reference number 120, the auto-configuration device may receive the ARP request from the ARP sender device via the monitored network port. An ARP sender device may use the ARP request when the ARP sender device has information (e.g., a target IP address) about a target device, such as the auto-configuration device, but lacks other information (e.g., a target MAC address) about the target device. The ARP sender device, lacking information about the MAC address of the auto-configuration device, may be unable to map the IP address of the auto-configuration device to the MAC address of the auto-configuration device. To map the IP address of the auto-configuration device to the MAC address of the auto-configuration device, the ARP sender device may broadcast the ARP request to one or more devices on the network, including the auto-configuration device.

The ARP request may include ARP information, such as a sender IP address, a sender MAC address, a target IP address, or other information associated with the ARP sender device or the target device. If the auto-configuration device receives the ARP request, and the target IP address associated with the ARP request matches the IP address of the auto-configuration device, the auto-configuration device may send an ARP response to the ARP sender device, which may include the MAC address of the auto-configuration device. An ARP response may be a reply message sent from the target device of the ARP request to the ARP sender device, which may include information, such as the IP address and MAC address of the ARP sender device as well as the target device. Receiving the ARP response from the auto-configuration device may enable the ARP sender device to map the target IP address to the target MAC address.

In some implementations, the auto-configuration device may perform one or more other techniques for obtaining the IP address of the auto-configuration device, in parallel with monitoring the network port for the ARP request. For example, the auto-configuration device may attempt to configure the IP address of the auto-configuration device using a static IP address, where a network administrator manually configures the IP address of the auto-configuration device. Additionally, or alternatively, the auto-configuration device may attempt to dynamically configure the IP address of the auto-configuration device, where the IP address of the auto-configuration device is automatically assigned to the auto-configuration device via DHCP, BOOTP, TR-069, or the like.

As shown in FIG. 1B, and by reference number 130, the auto-configuration device may configure the IP address of the auto-configuration device by using information included in the received ARP request. For example, and as shown, the auto-configuration device may configure the IP address of the auto-configuration device using the target IP address included in the received ARP request. As shown by reference number 140, after configuring the IP address of the auto-configuration device, the auto-configuration device may request configuration information from a configuration storage device (e.g., a server, etc.) via the ARP sender device.

As shown by reference number 150, the configuration storage device may, after receiving the configuration request from the auto-configuration device, transmit, via the ARP sender device, the configuration information to the auto-configuration device. As shown by reference number 160, the auto-configuration device may configure the auto-configuration device using the configuration information from the configuration storage device after receiving the configuration information.

In this way, an auto-configuration device may flexibly configure a protocol address (e.g., an IP address) based on information included in a received ARP request without requiring pre-configuration to support a particular request-response protocol for address resolution (e.g., DHCP, BOOTP, TR-069, etc.), which may vary across different customer premises, different networks, different countries, or the like. In this way, computing resources associated with pre-configuring the auto-configuration device may be conserved, and a network connectivity of the auto-configuration device may be increased.

As indicated above, FIGS. 1A and 1B are provided merely as an example. Other examples are possible and may differ from what was described with regard to FIGS. 1A and 1B.

Figure 2:
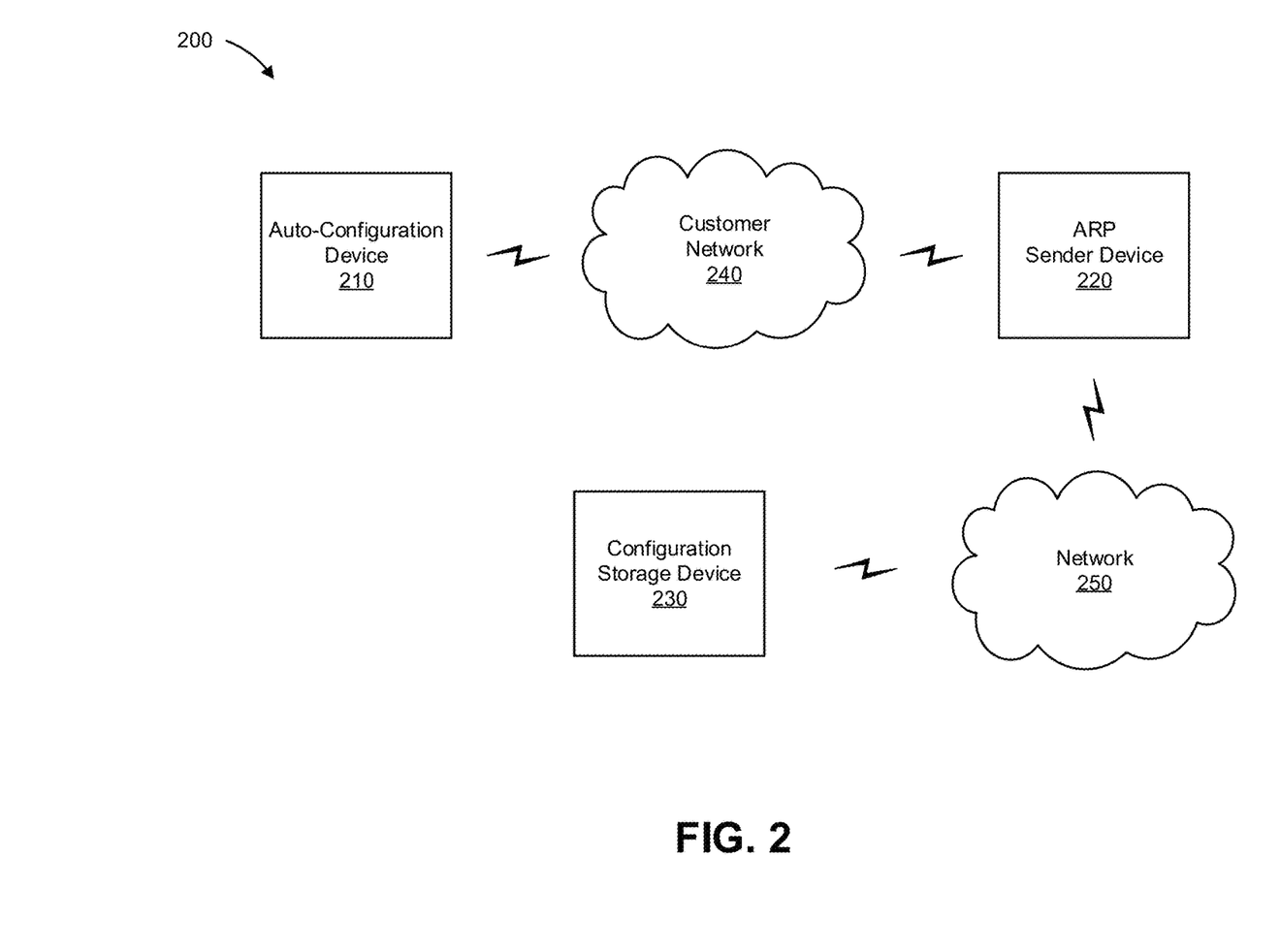
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an auto-configuration device 210, an address resolution protocol (ARP) sender device 220, a configuration storage device 230, a customer network 240, and a network 250. Devices of environment 200 may interconnect via wired connections, wireless connections, or a combination of wired and wireless connections.

Auto-configuration device 210 may include one or more configurable network devices provided by a service provider and/or associated with a service (e.g., a telecommunications service, an Internet service, a television service, etc.). Auto-configuration device 210 may include any device capable of connecting to a network and identifying configuration information for self-configuration (e.g., automatic configuration). For example, auto-configuration device 210 may include a customer premises equipment (CPE) device, such as a set-top box, a router, a machine-to-machine device, a cloud-controlled device, a gateway, a modem, or the like.

In some implementations, the service provider supplies the customer with auto-configuration device 210 or another network device associated with the service. In some implementations, auto-configuration device 210 may include a customer-supplied device, such as a customer-owned or customer-leased device that the customer supplies, rather than a device that the service provider supplies.

In some implementations, auto-configuration device 210 may include a device that is located at the customer's premises. In some implementations, auto-configuration device 210 may include a device that is located at premises different from the customer's premises, such as a device located at the service provider's premises or at a third-party's premises. In some implementations, a customer may include a subscriber of a service from the service provider or a user of auto-configuration device 210.

Auto-configuration device 210 may send traffic to and/or receive traffic from configuration storage device 230 (e.g., via customer network 240, ARP sender device 220, and network 250). Auto-configuration device 210 may interact with one or more devices of environment 200 to perform an automatic device configuration process, as described in more detail below.

ARP sender device 220 may include one or more devices capable of providing connectivity or communication between networks (e.g., between customer network 240 and network 250). For example, ARP sender device 220 may include a gateway, a router, a modem, a switch, a hub, a bridge, a wireless local area network (WLAN) access point, or a similar type of device. In some implementations, ARP sender device 220 may provide connectivity or communication between a remote network (e.g., network 250) and a host network (e.g., customer network 240). In some implementations, ARP sender device 220 may transmit an ARP request to auto-configuration device 210, or to another device connected to customer network 240.

Configuration storage device 230 may include one or more devices capable of generating, receiving, storing, processing, or providing configuration information (e.g., customer configuration information, such as customer preferences, customer account information, software, applications, etc.). For example, configuration storage device 230 may include a server (e.g., a configuration server) or a similar type of device. In some implementations, a customer or service provider may input configuration information to configuration storage device 230 (e.g., via a sign-up web form, etc.), which auto-configuration device 210 may access to perform an automatic device configuration process.

Customer network 240 may include one or more wired or wireless networks associated with a customer. For example, customer network 240 may include a local area network (LAN), a wide area network (WAN), a private network, an intranet, a cellular network, a public land mobile network (PLMN), a metropolitan area network (MAN), a telephone network (e.g., the Public Switched Telephone Network (PSTN)), an ad hoc network, the Internet, a fiber optic-based network, a cloud computing network, or the like, and/or a combination of these or other types of networks. In some implementations, auto-configuration device 210 may automatically configure itself to interoperate with other devices of customer network 240 (e.g., on a private network, an intranet, etc.).

Network 250 may include one or more wired and/or wireless networks. For example, network 250 may include a cellular network, a PLMN, a LAN, a WAN, a MAN, a telephone network (e.g., the PSTN), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
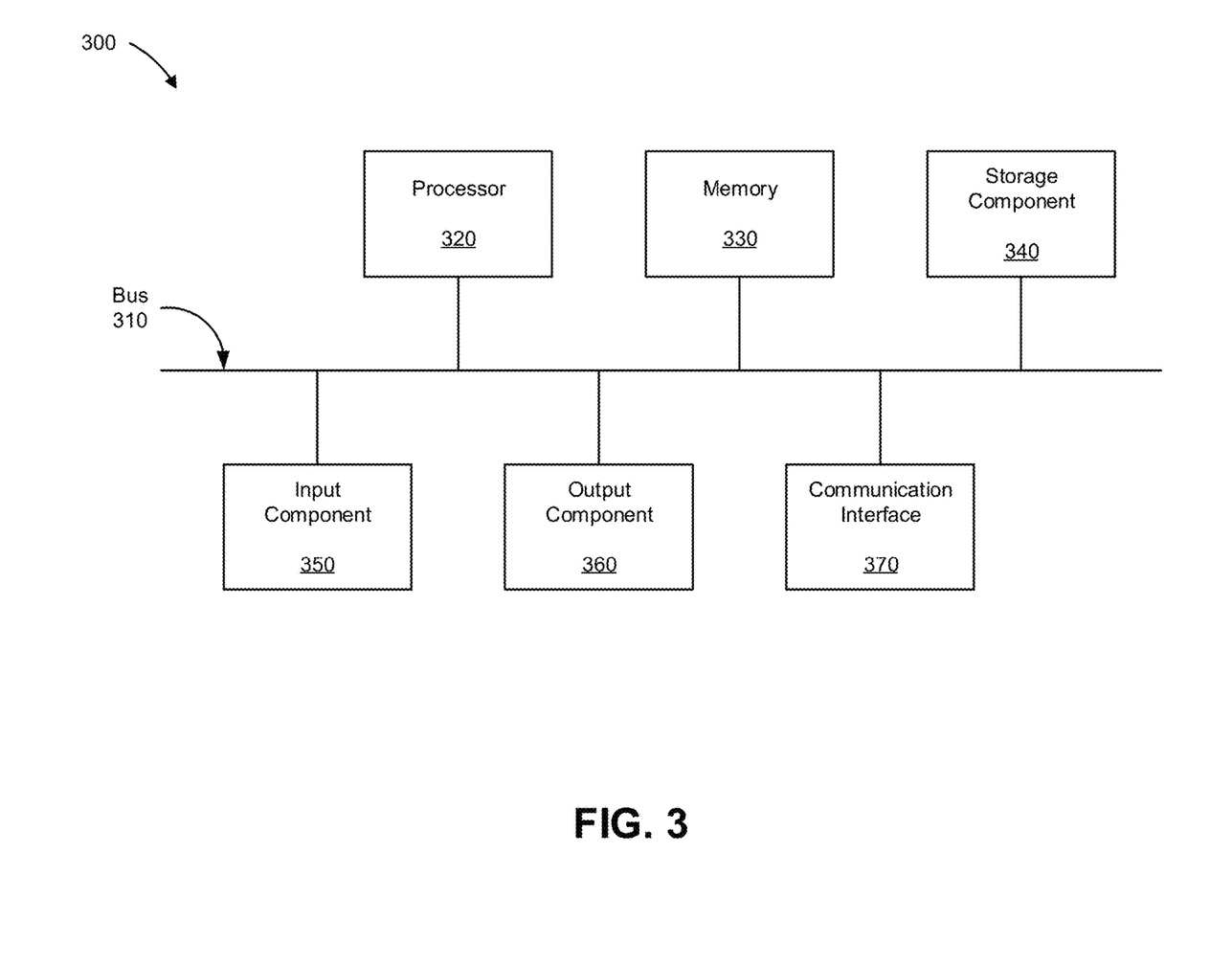
FIG. 3 is a diagram of example components of one or more devices of FIG. 2.

FIG. 3 is a diagram of example components of a device 300. Device 300 may correspond to auto-configuration device 210, ARP sender device 220, and/or configuration storage device 230. In some implementations, auto-configuration device 210, ARP sender device 220, and/or configuration storage device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
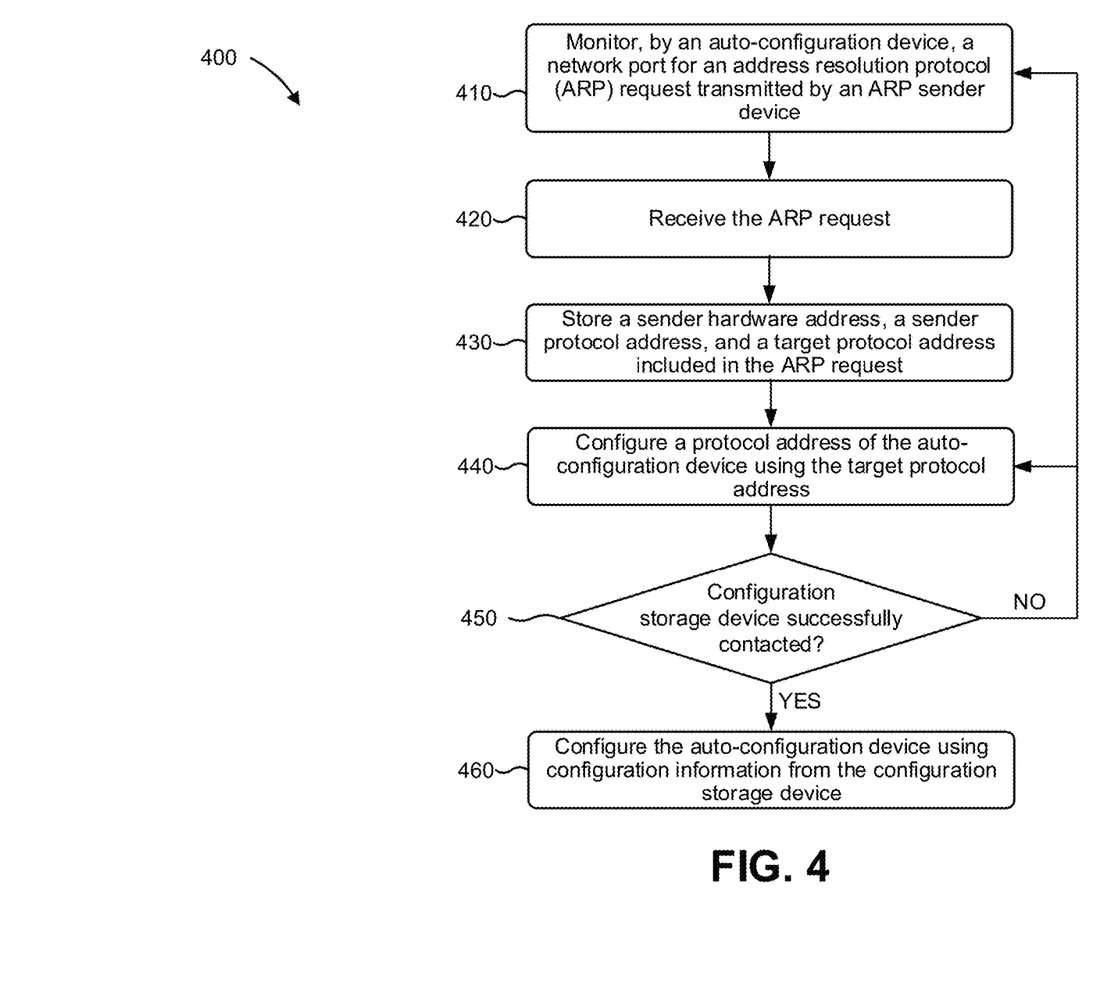
FIG. 4 is a flow chart of an example process for configuring a protocol address of an auto-configuration device using an address resolution protocol request.

FIG. 4 is a flow chart of an example process 400 for configuring a protocol address of an auto-configuration device using an address resolution protocol request. In some implementations, one or more process blocks of FIG. 4 may be performed by auto-configuration device 210. In some implementations, one or more process blocks of FIG. 4 may be performed by another device or a group of devices separate from or including auto-configuration device 210, such as ARP sender device 220 and/or configuration storage device 230.

As shown in FIG. 4, process 400 may include monitoring, by an auto-configuration device, a network port for an address resolution protocol (ARP) request transmitted by an ARP sender device (block 410), and receiving the ARP request (block 420). For example, auto-configuration device 210 may monitor a network port, such as an Ethernet port. Auto-configuration device 210 may receive one or more ARP requests from one or more ARP sender devices 220 via customer network 240.

In some implementations, the ARP request may include ARP information about ARP sender device 220 and auto-configuration device 210. For example, the ARP request may include information about ARP sender device 220, such as a sender IP address and a sender MAC address, and information about auto-configuration device 210 or another target device, such as a target IP address.

In some implementations, auto-configuration device 210 may attempt to connect to customer network 240 via the network port. For example, auto-configuration device 210 may use an Ethernet connection to dynamically configure an IP address from a network protocol server (e.g., by using DHCP, BOOTP, TR-069, etc.) on customer network 240. Additionally, or alternatively, auto-configuration device 210 may use a static IP address to establish a connection with customer network 240 via the network port.

In some cases, auto-configuration device 210 may not be able to configure an IP address, either by dynamic IP configuration or static IP configuration. For example, in the case of a failed configuration with a static IP address, the network administrator may not have pre-configured auto-configuration device 210 with a static IP address. Additionally, or alternatively, in the case of a failed dynamic IP configuration, auto-configuration device 210 may not be compatible with a protocol used by a network protocol server associated with customer network 240. For example, the network protocol server may use DHCP to dynamically configure IP addresses for devices on customer network 240, and auto-configuration device 210 may not be configured to obtain an IP address via DHCP.

In this case, where auto-configuration device 210 is unable to configure an IP address, dynamically or otherwise, auto-configuration device 210 may monitor the network port for an ARP request. ARP sender device 220 may broadcast the ARP request over customer network 240 to all devices connected to customer network 240 to map the IP address of the target device, such as auto-configuration device 210, to the MAC address of that target device. In some implementations, the target device of the ARP request may include auto-configuration device 210. Additionally, or alternatively, the target device of the ARP request may include a device on customer network 240 different from auto-configuration device 210. In some cases, auto-configuration device 210 may receive multiple ARP requests, including ARP requests where a device other than auto-configuration device 210 is the target device.

In some implementations, auto-configuration device 210 may attempt to configure the IP address of auto-configuration device 210 in parallel with monitoring the network port for an ARP request and independent of any ARP request that auto-configuration device 210 has received. For example, auto-configuration device 210 may attempt, in parallel with monitoring, to dynamically configure the IP address of auto-configuration device 210 via one or more protocols, such as DHCP, BOOTP, TR-069, or the like.

In some cases, the parallel attempts to configure the IP address of auto-configuration device 210 by dynamic configuration may fail to configure the IP address of auto-configuration device 210. In this case, auto-configuration device 210 may repeat the parallel attempts to dynamically configure the IP address of auto-configuration device 210. When repeating the parallel attempts to configure the IP address of auto-configuration device 210, auto-configuration device 210 may repeat the attempts according to a predetermined schedule or set of conditions. Additionally, or alternatively, auto-configuration device 210 may remain idle until receipt of the IP address from an external source (e.g., a network administrator, etc.). In some implementations, auto-configuration device 210 may use information associated with the ARP request to configure the IP address of auto-configuration device 210, as described in more detail below.

In this way, computing resources may be conserved by reducing technical configuration of auto-configuration device 210, and compatibility of auto-configuration device 210 with customer network 240 may be increased.

As further shown in FIG. 4, process 400 may include storing a sender hardware address, a sender protocol address, and a target protocol address included in the ARP request (block 430). For example, auto-configuration device 210 may receive an ARP request while monitoring the network port, as described above. The ARP request may include ARP information, such as the sender hardware address (e.g., the sender MAC address), the sender protocol address (e.g., the sender IP address), the target protocol address (e.g., the target IP address), or the like.

Auto-configuration device 210 may store the ARP information associated with the ARP request. In some implementations, auto-configuration device 210 may store the sender IP address and/or the sender MAC address associated with the ARP request. Additionally, or alternatively, auto-configuration device 210 may store a counter variable, which may include a value (e.g., a string, a number, or the like, such as 1, 2, 3, etc.). In some implementations, the counter variable may be associated with the target IP address, the sender IP address, the sender MAC address, or some combination of these addresses or other ARP information. In some cases, the counter variable may represent a quantity of times that auto-configuration device 210 has received an ARP request with a particular set of ARP information, such as a particular target IP address.

In this way, flexible configuration of an IP address may be enabled and computing resources may be conserved by reducing technical configuration.

As further shown in FIG. 4, process 400 may include configuring a protocol address of the auto-configuration device using the target protocol address (block 440). For example, auto-configuration device 210 may use the target IP address associated with at least one of the ARP requests to configure the IP address of auto-configuration device 210. In some implementations, the counter variable may need to satisfy a threshold value for auto-configuration device 210 to configure using the target IP address, as discussed below.

In some implementations, auto-configuration device 210 may prevent auto-configuration device 210 from using the target IP address for configuration of the IP address of auto-configuration device 210 if auto-configuration device 210 is able to configure the IP address of auto-configuration device 210 via static or dynamic IP address configuration using a protocol other than ARP. For example, if auto-configuration device 210 is able to statically configure the IP address of auto-configuration device 210 or to dynamically configure the IP address of auto-configuration device 210 using a protocol other than ARP, then auto-configuration device 210 may not use the target IP address included in the ARP request to configure the IP address of auto-configuration device 210. Additionally, or alternatively, auto-configuration device 210 may configure the IP address of auto-configuration device 210 using the target IP address associated with the ARP request after a protocol other than ARP (e.g., BOOTP, DHCP, TR-069, etc.) has timed out, has performed a threshold quantity of attempts, has failed, or the like.

In some implementations, auto-configuration device 210 may use a target IP address to configure the IP address of auto-configuration device 210 if the counter variable associated with the target IP address has satisfied a threshold (e.g., a threshold value, such as two, three, five, etc.) or some other set of conditions. For example, assume that the counter variable associated with a target IP address is needed to be greater than or equal to a value of two before auto-configuration device 210 may use that target IP address to configure the IP address of auto-configuration device 210. Further assume, for example, that auto-configuration device 210 has incremented the counter variable for the target IP address to a value equal to two.

In this case, the counter variable may indicate that auto-configuration device 210 has received two ARP requests that include the target IP address and that the threshold value for the counter variable is satisfied. In some implementations, when the counter variable threshold is satisfied, auto-configuration device 210 may configure the IP address of auto-configuration device 210 to the target IP address associated with the counter variable.

Instead, for example, assume that the threshold value has a value of three, meaning auto-configuration device 210 may need to receive three or more ARP requests for the target IP address before configuring the IP address of auto-configuration device 210 with the target IP address. If, as in the previous example, the counter variable associated with the target IP address has a value of two, auto-configuration device 210 may prevent auto-configuration device 210 from using the target IP address for configuration of the IP address of auto-configuration device 210 because the counter variable has not satisfied the threshold value of three.

Additionally, or alternatively, auto-configuration device 210 may use the value of the counter variable to determine the availability of a particular IP address for IP address configuration (e.g., configuring the IP address of auto-configuration device 210, etc.). For example, as discussed above, the value associated with the counter variable may be associated with the quantity of times that auto-configuration device 210 has received an ARP request associated with a particular target IP address.

For example, assume that the value associated with the counter variable equals a value of one. In this case, the value of one indicates that auto-configuration device 210 has received one ARP request associated with the target IP address. In some implementations, a counter variable value of one may indicate that the target IP address is associated with a device on customer network 240 different from auto-configuration device 210 (e.g., a network device other than auto-configuration device 210, etc.).

In this case, the network device may have been configured with the target IP address and may have sent an ARP response to ARP sender device 220 as a reply to the ARP request. By receiving the ARP response to the ARP request, ARP sender device 220 may have been able to map the target IP address to a corresponding MAC address of the network device.

Based on being able to map the target IP address to the corresponding MAC address of the network device, ARP sender device 220 may not have resent the ARP request. In this case, the counter variable may equal one because auto-configuration device 210 has received one ARP request associated with the target IP address. Auto-configuration device 210 may determine that the target IP address is unavailable for IP address configuration of auto-configuration device 210 because the value of the counter variable associated with the target IP address is equal to one.

In this way, multi-network protocol compatibility and flexible configuration of protocol settings may be enabled.

As further shown in FIG. 4, process 400 may include determining whether the configuration storage device has been successfully contacted (block 450). For example, auto-configuration device 210 may attempt to contact configuration storage device 230 (e.g., by using a domain name, a network address, etc.). In some implementations, the domain name, network address, or the like, of configuration storage device 230 may be hard coded and/or stored in a memory of auto-configuration device 210. Additionally, or alternatively, the domain name, network address, or the like, may be provided to auto-configuration device 210 and/or stored in a location external to auto-configuration device 210. For example, auto-configuration device 210 may receive the domain name, network address, or the like, after initial power-on.

Auto-configuration device 210 may contact configuration storage device 230 by sending a request for configuration information to configuration storage device 230 via ARP sender device 220, or another network gateway. In some cases, configuration storage device 230 may reply to the request by sending configuration information to auto-configuration device 210. Additionally, or alternatively, auto-configuration device 210 may contact configuration storage device 230 using another type of communication or message that prompts configuration storage device 230 to send configuration information to auto-configuration device 210.

In some cases, auto-configuration device 210 receiving configuration information or another reply from configuration storage device 230 may confirm that auto-configuration device 210 has configured the correct IP address of auto-configuration device 210, using the target IP address. For example, if auto-configuration device 210 configures the IP address using the target IP address and does not receive configuration information from configuration storage device 230, auto-configuration device 210 may determine that auto-configuration device 210 has used an incorrect target IP address for configuration of the IP address of auto-configuration device 210, that the received ARP request was from an ARP sender device 220 other than a network gateway, or the like.

Additionally, or alternatively, if, for example, auto-configuration device 210 receives configuration information from configuration storage device 230, auto-configuration device 210 may determine that the target IP address is the correct IP address for IP address configuration of auto-configuration device 210. In some cases, after configuring the IP address of auto-configuration device 210 with the correct target IP address, auto-configuration device 210 may lack one or more IP parameters to fully connect with other devices on customer network 240 or to operate as intended.

For example, configuring auto-configuration device 210 with the correct target IP address may enable auto-configuration device 210 to obtain configuration information from configuration storage device 230, and not to otherwise function as intended. Additionally, or alternatively, configuring the IP address of auto-configuration device 210 may include using protocols, processes, procedures, or the like that do not use a subnet or network mask, where an identifier is used to determine the subnet or the network to which the IP address belongs.

In this way, flexible configuration of an IP address may be enabled by using one or more protocols to configure the IP address and computing resources may be conserved by reducing technical configuration.

As further shown in FIG. 4, if the configuration storage device has not been successfully contacted (block 450—NO), then process 400 may include returning to block 410 or block 440. For example, if auto-configuration device 210 does not successfully contact configuration storage device 230 using a first target IP address, then auto-configuration device 210 may continue to monitor the network port for an ARP request transmitted by ARP sender device 220. In some cases, auto-configuration device 210 may reinitiate monitoring of the network port if auto-configuration device 210 has previously ceased monitoring the network port.

Additionally, or alternatively, auto-configuration device 210 may attempt to configure the IP address of auto-configuration device 210 with a second target IP address. For example, following an unsuccessful attempt to contact configuration storage device 230 using the first target IP address, auto-configuration device 210 may reconfigure the IP address of auto-configuration device 210 with the second target IP address, which is an IP address different from the first target IP address.

In some cases, auto-configuration device 210 may delete, or remove from storage, the target IP address used to attempt to contact configuration storage device 230, if auto-configuration device 210 was unable to successfully contact configuration storage device 230 using the target IP address. For example, if auto-configuration device 210 configured the IP address of auto-configuration device 210 with the first target IP address and was not able to successfully contact configuration storage device 230 with the first target IP address, then auto-configuration device 210 may delete, or remove from storage, the first target IP address. In some cases, deleting the target IP address may include deleting the target IP address, the sender IP address, the sender MAC address, or some combination of ARP information.

In some cases, deleting or removing the target IP address and/or other ARP information may cause a looping effect, where auto-configuration device 210 uses the target IP address multiple times to attempt to contact configuration storage device 230. For example, auto-configuration device 210 may use the target IP address each time auto-configuration device 210 receives the target IP address. In some implementations, auto-configuration device 210 may mark or tag the target IP address with an identifier, such as a string, a number, or the like, to indicate that auto-configuration device 210 has used the target IP address without successfully contacting configuration storage device 230, rather than deleting or removing the target IP address. Marking or tagging the target IP address may enable subsequent use of the target IP address, if desired (e.g., if no other IP addresses are available), and/or may reduce or eliminate the looping effect, as described above. In some implementations, auto-configuration device 210 may reuse a target IP address because a failure to contact configuration storage device 230 may be due to a network issue, rather than an incorrect IP address for auto-configuration device 210.

Additionally, or alternatively, auto-configuration device 210 may receive an ARP request from an ARP sender device 220 other than a network gateway. In this case, when auto-configuration device 210 attempts to contact configuration storage device 230 using the ARP information associated with the ARP request from the ARP sender device 220 other than a network gateway, auto-configuration device 210 may receive an internet control message protocol (ICMP) redirect message. An ICMP redirect message may include an error message sent by a network device indicating that a packet is being routed sub-optimally and may further inform the device that receives the ICMP redirect message of the correct or optimal network gateway or address for routing the packet.

In some cases, the ICMP redirect message may contain routing information, such as an IP address or a MAC address, for the network gateway. In this case, auto-configuration device 210 may use the information included in the ICMP redirect message to attempt to contact configuration storage device 230 via the network gateway.

As further shown in FIG. 4, if the configuration storage device has been successfully contacted (block 450—YES), then process 400 may include configuring the auto-configuration device using configuration information from the configuration storage device (block 460). For example, auto-configuration device 210 may obtain configuration information from configuration storage device 230 based on successfully contacting configuration storage device 230. In some cases, configuration information may include information associated with software or application configurations, account or subscription information, customer preferences, customer settings, or the like.

In some cases, following successful contact with configuration storage device 230, auto-configuration device 210 may cease monitoring the network port for an ARP request. Additionally, or alternatively, auto-configuration device 210 may continue to monitor the network port until a set of conditions is satisfied. For example, a condition may include auto-configuration device 210 obtaining all or a portion of the configuration information from configuration storage device 230. Additionally, or alternatively, in association with successfully contacting configuration storage device 230, auto-configuration device 210 may cease using one or more other processes or procedures for configuring the IP address of auto-configuration device 210 (e.g., via static IP address or dynamic IP address configuration, etc.).

In this way, computing resources may be conserved by reducing technical configuration. Additionally, or alternatively, configuration and compatibility between auto-configuration device 210 and customer network 240 may be enhanced via employment of one or more strategies for configuring an IP address of auto-configuration device 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein may reduce or eliminate the requirement to pre-configure an auto-configuration device for compatibility with one or more protocols. Instead, the auto-configuration device may flexibly configure a protocol address using information associated with an ARP request, regardless of the protocol that a network protocol server, or other similar device, uses. This may conserve computing resources that would otherwise be used to configure the auto-configuration device for compatibility with the protocol that the network protocol server uses, or to configure the auto-configuration device with a static protocol address. In addition, this may simplify network infrastructure, enable flexible configuration of IP addresses, allow for cross and multi-network compatibility, and enhance configuration between the auto-configuration device and the network by employing one or more strategies for obtaining a protocol address.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a memory; and
   one or more processors to:
   monitor a network port for an address resolution protocol (ARP) request from a sender device,
   the ARP request including a sender hardware address associated with the sender device, a sender protocol address associated with the sender device, and a target protocol address associated with a target device;
   detect the ARP request based on monitoring the network port for the ARP request;
   determine that the device is able to configure a protocol address of the device using a protocol other than ARP;
   determine a value associated with the target protocol address,
   the value indicating a quantity of times that the target protocol address has been received in one or more ARP requests;
   prevent, until a threshold quantity associated with configuring the protocol address using the protocol other than ARP has occurred, the device from configuring the protocol address with the target protocol address; and
   determine that the value satisfies the threshold quantity; and
   configure the protocol address of the device using the target protocol address based on determining that the value satisfies the threshold quantity.

2. The device of claim 1, where the one or more processors are further to:
   determine that the device has not successfully contacted another device after configuring the protocol address of the device; and
   configure the protocol address of the device using a different target protocol address, included in a different ARP request, based on determining that the device has not successfully contacted the other device.

3. The device of claim 2, where the one or more processors, when determining that the device has not successfully contacted the other device, are to:
   receive an internet control message protocol (ICMP) redirect message; and
   determine that the device has not successfully contacted the other device based on receiving the ICMP redirect message.

4. The device of claim 1, where the one or more processors are further to:
   determine that an amount of time has elapsed without the protocol address of the device being configured using a protocol other than ARP; and
   where the one or more processors, when configuring the protocol address of the device, are to:
   configure the protocol address of the device using the target protocol address based on determining that the amount of time satisfies the threshold quantity.

5. The device of claim 1, where the ARP request is associated with a protocol used to map hardware addresses to internet protocol addresses.

6. The device of claim 1, where the sender hardware address is a media access control (MAC) address of the sender device;
   where the sender protocol address is an internet protocol (IP) address of the sender device; and
   where the target protocol address is an internet protocol address of the target device.

7. A non-transitory computer-readable medium storing instructions, the instructions comprising:
   one or more instructions that, when executed by one or more processors of a first device, cause the one or more processors to:
   receive an address resolution protocol (ARP) message sent by a second device,
   the ARP message being associated with a protocol used to map media access control (MAC) addresses to corresponding internet protocol (IP) addresses, and
   the ARP message including:
   a sender MAC address associated with the second device,
   a sender IP address associated with the second device, and
   a target IP address;
   determine that the first device is able to configure an IP address of the first device using a protocol other than ARP;
   determine a value associated with the target IP address;
   prevent, until a threshold quantity associated with configuring the IP address using the protocol other than ARP has occurred, the first device from configuring the IP address with the target IP address;
   determine that the value matches the threshold quantity; and configure the IP address of the first device using the target IP address based on determining that the value matches the threshold quantity.

8. The non-transitory computer-readable medium of claim 7, where the one or more instructions, when executed by the one or more processors, further cause the one or more processors to:
contact a third device after configuring the IP address of the first device;
receive configuration information from the third device based on contacting the third device; and
configure the first device using the configuration information.

9. The non-transitory computer-readable medium of claim 7,
where the one or more instructions, that cause the one or more processors to determine that the first device is able to configure the IP address using a protocol other than ARP, cause the one or more processors to:
determine that the first device is able to configure the IP address of the first device using at least one of:
a dynamic host configuration protocol (DHCP)
a bootstrap protocol (BOOTP), or
a technical report 069 protocol (TR-069); and
where the one or more instructions, that cause the one or more processors to configure the IP address of the first device, cause the one or more processors to:
configure the IP address of the first device using the protocol other than ARP.

10. The non-transitory computer-readable medium of claim 7, where the one or more instructions, when executed by the one or more processors, further cause the one or more processors to:
determine that the first device has not successfully contacted a third device after configuring the IP address of the first device; and
configure the IP address of the first device using another target IP address included in a second ARP message.

11. The non-transitory computer-readable medium of claim 7, where the one or more instructions, when executed by the one or more processors, further cause the one or more processors to:
receive an internet control message protocol (ICMP) redirect message after configuring the IP address of the first device; and
determine that the first device has not successfully configured the IP address of the first device based on receiving the ICMP redirect message.

12. The non-transitory computer-readable medium of claim 7,
where the one or more instructions, that cause the one or more processors to determine that the first device is able to configure the IP address using a protocol other than ARP, cause the one or more processors to:
determine that the first device has not successfully configured the IP address of the first device using a static IP address; and
where the one or more instructions, that cause the one or more processors to configure the IP address of the first device, cause the one or more processors to:
configure the IP address of the first device using the target IP address based on determining that the first device has not successfully configured the IP address of the first device using the static IP address.

13. A method, comprising:
monitoring, by a first device, a network port for an address resolution protocol (ARP) request from a second device,
the ARP request being associated with a protocol used to map hardware addresses to corresponding protocol addresses;
detecting, by the first device, the ARP request based on monitoring the network port for the ARP request,
the ARP request including:
a sender hardware address associated with the second device,
a sender protocol address associated with the second device, and
a target protocol address associated with the ARP request;
determining, by the first device, that the first device is able to configure a protocol address of the first device using a protocol other than ARP;
determining, by the first device, a quantity of times that the first device has received ARP requests that include the target protocol address;
preventing, by the first device and until a threshold quantity associated with configuring the protocol address using the protocol other than ARP has occurred, the first device from configuring the protocol address with the target protocol address;
determining, by the first device, that the quantity of times satisfies the threshold quantity; and
configuring, by the first device, the protocol address of the first device using the target protocol address based on determining that the quantity of times satisfies the threshold quantity.

14. The method of claim 13, further comprising:
storing the target protocol address associated with the ARP request;
determining that the first device has not successfully contacted a third device using the target protocol address; and
deleting the target protocol address based on determining that the first device has not successfully contacted the third device using the target protocol address.

15. The method of claim 13, where monitoring the network port for the ARP request from the second device comprises:
determining that the protocol address of the first device has not been pre-configured; and
monitoring the network port for the ARP request from the second device based on determining that the protocol address of the first device has not been pre-configured.

16. The method of claim 13, where the network port is an Ethernet port.

17. The method of claim 13, where the sender hardware address is a media access control address associated with the second device; and
where the sender protocol address is an internet protocol address associated with the second device.

18. The device of claim 1, where the one or more processors are further to:
determine that the device has not successfully contacted another device using the target protocol address; and
delete the target protocol address based on determining that the device has not successfully contacted the other device using the target protocol address.

19. The non-transitory computer-readable medium of claim 7, where the one or more instructions, when executed by the one or more processors, further cause the one or more processors to:

determine that the first device has not successfully contacted a third device using the target IP address; and delete the target IP address based on determining that the first device has not successfully contacted the third device using the target IP address.

20. The method of claim 13, further comprising:

determining that the first device has not successfully contacted a third device after configuring the protocol address of the first device; and configuring the protocol address of the first device using a different target protocol address, included in a different ARP request, based on determining that the first device has not successfully contacted the third device.

\* \* \* \* \*